United States Patent [19]

Baines

[11] Patent Number: 4,812,693

[45] Date of Patent: Mar. 14, 1989

[54] SOLDERLESS CONNECTION FOR AN ELECTRIC MOTOR

[75] Inventor: Roger F. Baines, Repulse Bay, Hong Kong

[73] Assignee: Johnson Electrical Industrial Manufactory, Limited, Chaiwan, Hong Kong

[21] Appl. No.: 83,285

[22] Filed: Aug. 10, 1987

[30] Foreign Application Priority Data

Aug. 11, 1986 [GB] United Kingdom ............... 8619549

[51] Int. Cl.⁴ .................... H02K 11/00; H01R 13/38
[52] U.S. Cl. .................................. 310/71; 439/401; 439/417
[58] Field of Search ............... 310/71, 238, 239, 244, 310/249; 439/401, 417, 656, 657

[56] References Cited

U.S. PATENT DOCUMENTS

| | | | |
|---|---|---|---|
| 3,115,541 | 12/1963 | Hanner et al. | 439/417 |
| 3,502,917 | 3/1970 | Bizoe | 310/71 |
| 3,518,616 | 6/1970 | Lewis | 310/71 X |
| 4,003,128 | 1/1977 | Dochterman | 310/71 X |
| 4,262,985 | 4/1981 | Muehlhausen | 439/401 |
| 4,429,243 | 1/1984 | Crow | 310/71 |
| 4,444,449 | 4/1984 | Aysta et al. | 439/401 |
| 4,466,687 | 8/1984 | Frantz | 439/656 X |
| 4,656,378 | 4/1987 | Atherton et al. | 310/71 |
| 4,691,977 | 9/1987 | Marzili et al. | 439/417 X |
| 4,707,627 | 11/1987 | Best | 310/71 |

FOREIGN PATENT DOCUMENTS

| | | |
|---|---|---|
| 0095307 | 11/1983 | European Pat. Off. |
| 1918193 | 10/1970 | Fed. Rep. of Germany |
| 1762619 | 6/1971 | Fed. Rep. of Germany |
| 2609291 | 9/1977 | Fed. Rep. of Germany |
| 903064 | 8/1962 | United Kingdom |
| 905814 | 9/1962 | United Kingdom |
| 928596 | 6/1963 | United Kingdom |
| 1360283 | 7/1974 | United Kingdom |
| 2026784 | 2/1980 | United Kingdom |
| 2096842 | 10/1982 | United Kingdom |

*Primary Examiner*—Mark O. Budd
*Attorney, Agent, or Firm*—Fleit, Jacobson, Cohn & Price

[57] ABSTRACT

A solderless connection between a wire lead and a terminal of an electric motor is formed by squeezing the lead wire and the terminal together by means a slide member which is affixed in a recess in an end cap of the motor housing. The terminal has a U-shaped portion which receives the wire. A sloping wall of the slide member squeezes the U-shape portion against a side wall of the recess as the slide member is pushed home, causing the terminal to grip the wire, to reduce strain on the electrical connection if the wire is pulled.

6 Claims, 2 Drawing Sheets

U.S. Patent   Mar. 14, 1989   Sheet 1 of 2   4,812,693

SOLDERLESS CONNECTION FOR AN ELECTRIC MOTOR

INTRODUCTION

The present invention relates to a solderless connection for an electric motor and to a motor incorporating such a connection. The invention is particularly applicable to fractional horsepower permanent magnet direct current motors.

BACKGROUND

All electric motors have some form of terminal for connection to supply leads from an external power supply or electric circuit Some electric motors have terminal posts on which a male or female connector may be an interference fit. Other motors require supply leads to be welded or soldered to terminals of the motor. It is also known for some motor terminals to have resilient terminations having star shaped holes into which a wire is pushed to make electrical connection.

In many motor applications it is desirable to have connections which are not soldered and in which it is not necessary to fit male or female adaptors to the wires before connecting them to the motor. The resilient star hole meets this requirement.

There are however applications in which the motor in use is subjected to vibration and climate changes of extreme temperatures and humidity. In these circumstances the resilient star hole connector may not be adequate as the connector/wire interface may be eroded.

The present invention seeks to provide a new method of connecting lead wires to a motor without soldering or additional male or female connectors but with sufficient security to ensure that the electrical connection will not degrade or fail even under severe vibration.

SUMMARY OF THE INVENTION

A first aspect of the invention provides an electric motor, comprising a housing and a member adapted to be secured to the housing, wherein an electrical terminal of the motor projects between the housing and the member and the member cooperates with the housing to trap a lead wire in electrical connection with the terminal when the member is secured to the housing. Preferred features of the invention will be apparent from the following detailed description and the accompanying claims.

DESCRIPTION OF PREFERRED EMBODIMENT

Figure 1:
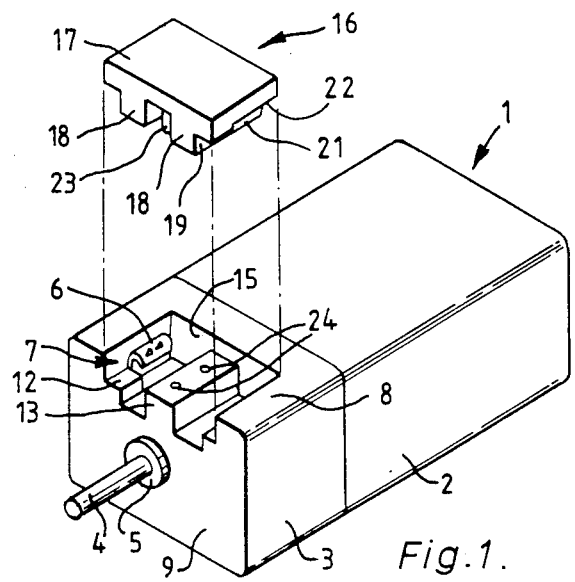
FIG. 1 is a perspective view of a fractional horsepower permanent magnet direct current electric motor according to the invention, showing a slide member removed from an end cap of the motor.

FIG. 1 shows a fractional horsepower permanent magnet D.C. (PMDC) motor embodying the solderless connection of the invention. A motor housing comprising a deep drawn can-like metal casing 2 and a moulded plastics end cap 3 houses a rotor comprising a wound armature and a commutator mounted on a shaft 4 journalled in bearings at each end of the motor. One such bearing indicated generally by reference numeral 5 is shown in the end cap 3. Permanent magnets are supported inside the casing 2, forming the motor stator. The end cap 3 carries a pair of brush-leaves and brushes making electrical contact with the commutator. Terminal parts of the brushleaves are held by and project through the end cap 3. The general construction thus far described is well known and commonly found in PMDC motors. A particular example is the applicants PMDC motor marketed under the catalogue number NF213G.

The improvement provided by the present invention is the formation of a solderless connection for power supply leads to the motor, as will be described hereinafter.

Figure 5:
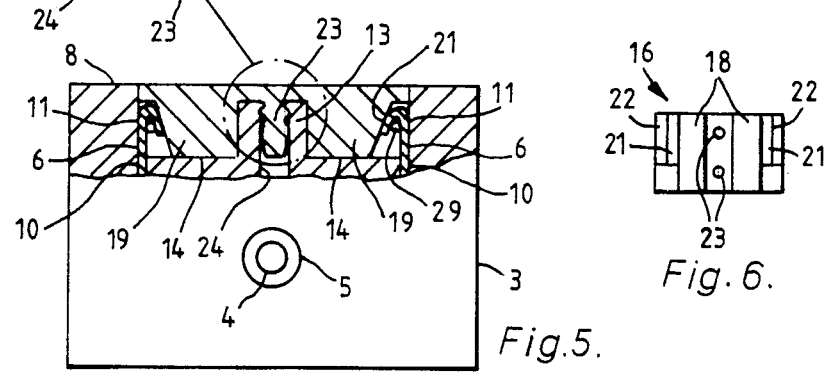
FIG. 5 is an enlarged part cross-sectional view along the line V—V of FIG. 3.
Figure 6:
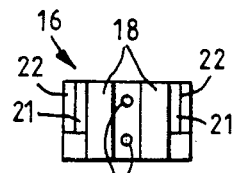
FIG. 6 is an underneath view of the slide member of FIG. 1.

The brush leaf terminal parts 6 extend through slots 10 (FIG. 5) in a sidewall 8 of the end cap 3 into a cutout or recess 7 which extends from an end face 9 of the end cap.

Figure 4:
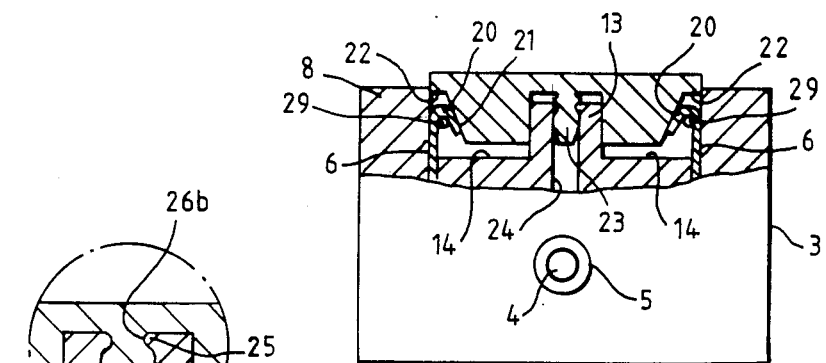
FIG. 4 is an enlarged part cross-sectional view along the line IV—IV of FIG. 2.

The terminal parts 6 are located at sidewalls 11 of the recess 7. As can be seen in FIGS. 1 and 4, the terminal parts are bent over to form a U-shaped portion 20.

A step 12 is formed in the recess between each brush leaf 6 and the end face 9, and a saddle 13 extends up from a bottom wall 14 of the recess, running from the front wall 9 to a rear wall 15 of the recess.

A slider 16 is a snug fit in the recess 7. The slider comprises an upper wall 17, and a pair of downwardly projecting legs 18.

Figure 2:
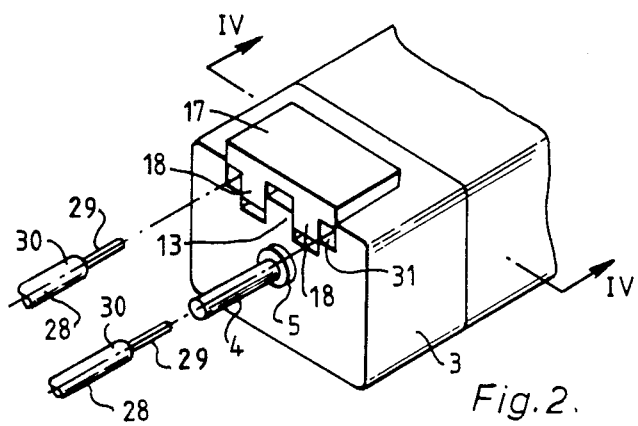
FIG. 2 is a perspective part view of the motor of FIG. 1, with the slide member partially slid into the end cap.
Figure 3:
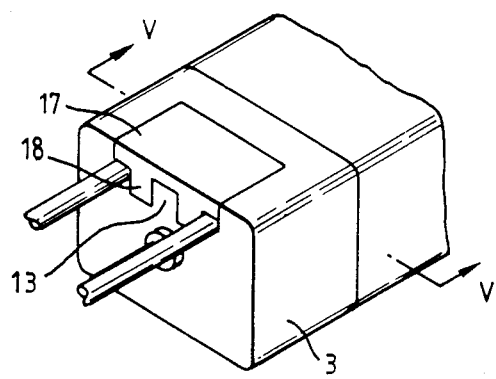
FIG. 3 is a perspective part view of the motor of FIG. 1 with the slide member slid fully home.

As seen in FIGS. 1 to 3, the outer end 19 of each leg 18 is rectangular and adapted to fit snugly between the saddle 13 and the respective step 12. The depth of the legs 18 and saddle 13 is such that the underneath surface of upper wall 17 is spaced from the steps 12 to form a passage for a power supply lead, as will be hereinafter described. Behind the end part 19, the legs 18 have a sloping sidewall 21 which is arranged to bear on the U-shaped portion 20 of the brush leaf terminal parts 6, and the underneath surface of the upper wall 17 has a step 22 to provide clearance above the portion 20.

A pair of prongs 23 project down from the underneath of upper wall 17, between the legs 18 and are arranged to be received in blind apertures or through holes 24 in the saddle 13. An inwardly directed lip 25 is formed at the outer end of each aperture 24. Each prong 23 has two detents 26a, 26b which cooperate with the lips 25 as the slider is pushed home. The lower detent 26a locks with the lip 25 to hold the slider in a first position as illustrated in FIG. 2, and when the slider is pushed fully home, FIG. 3, the detent 26b locks with the lip 25.

The operation of the solderless connection will now be described in more detail.

The electric motor is assembled in the normal way, with the brush leaf terminal parts 6 being inserted through the apertures 10 in the sidewall 8 of the end cap 3. The ends of the terminal parts 6 are then bent over to form U-shaped portions 20 which are above the level of the steps 12. As seen in FIG. 1, triangular shaped nibs 27 may be stamped in the brush leaves, preferably before assembly in the end caps, to enhance the grip on a wire.

Slider 16 is then pushed home to the first position, seen in FIGS. 2 and 4. Upper wall 17 and legs 18 then cooperate with the steps 12 to form channels 31. The sloping sidewalls 21 of the legs 18 are clear of, or bear slightly on the portions 20. This will depend on the accuracy of the formation of the portions 20: it is important that the portions 20 are left open sufficiently to receive a power supply lead. Prongs 23 are received in the apertures 24, and the detents 26a cooperate with the lips 25 to hold the slider in position.

Preferably the motor is shipped to a customer in this condition, but the motor may be supplied with the slider separated therefrom.

To connect the motor to a power supply or other circuitry, power supply leads 28 having bared ends 29 are inserted into the channels 31 and the bared ends 29 are received in the U-shaped portions 20. The slider 16 is then pushed fully home. The sloping sidewalls 21 on the legs 18 bear on the portions 20 to squeeze them and so clamp the wires 29 to form an electrical connection and hold the wires firmly in position. The height of the saddle 13 is arranged so that the coated portion of the wire down stream of the connection to the terminal is gripped between the upper wall 17 and the step 12. This will thus reduce or avoid strain on the connection between the wire and the terminal if the wire is pulled. The slider is held in place by the detents 26b which cooperate with the lips 25 of the apertures 24 as the slider and hence prongs 23 are pushed fully home.

Whilst reference has been made simply to a brush leaf 6, it should be appreciated that the brush leaf may be a two part brush leaf as is commonly known in the art, an inner part of the leaf being of particularly resilient material and carrying the brush, whilst an outer part of the leaf, projecting outside of the end cap, is of less resilient material, generally being of greater thickness, to facilitate connection to a lead wire, and, in the present case, clamping onto the wire.

The application is not limited to plastics end caps but is applicable to metal end caps, for example anodised aluminium, or composites or mixtures of material for the end cap and slider. Also, although the invention finds particular utility in providing a solderless terminal for a brush leaf, it has general application in an electric motor, for example for connection of a supply lead to the winding of a wound stator.

Various modifications will be apparent to those in the art and it is desired to include all such modifications as fall within the scope of the accompanying claims.

What is claimed is:

1. A fractional horsepower permanent magnet direct current motor, comprising a housing having an end cap, brush gear mounted in the end cap, said brush gear comprising a brush leaf carrying a brush, said brush leaf having a terminal part which projects through a wall of the end cap into a recess in an outer surface of the end cap, a member secured to the housing and movable between first and second positions, said member projecting partially into said recess in said first position defining a channel for insertion of a supply lead wire into the recess and being housed fully in said recess in said second position, said member and said housing each having a cooperating surface, said cooperating surfaces being arranged to squeeze the terminal part against the supply lead wire and trap the supply lead wire in electrical connection with said terminal part as said member is moved from the first position to the second position.

2. A motor as claimed in claim 1, wherein the terminal part is U-shaped, and said cooperating surfaces are arranged to collapse said U-shaped terminal part onto a said supply lead wire to form the electrical connection.

3. A motor as claimed in claim 2, wherein said member cooperates with said housing to clamp the supply lead downstream of the electrical connection with the terminal part.

4. A fractional horsepower permanent magnet direct current motor, comprising a housing having an end cap, brush gear mounted in the end cap, said brush gear comprising a brush leaf carrying a brush, said brush leaf having a terminal part which projects through a wall of the end cap into a recess in an outer surface of the end cap, a member secured to the housing and movable between first and second positions, said member projecting partially into said recess in said first position and being housed fully in said recess in said second position, said member and said housing each having a cooperating surface, said cooperating surfaces being arranged to trap a supply lead wire in electrical connection with said terminal part as said member is moved from the first position to the second position, wherein a saddle is provided on a base of the recess, the saddle dividing the recess in two parts, said motor having two brush leaves, each having a respective terminal part projecting into a respective part of said recess, and said member has an upper wall and two legs which project down from said upper wall and on either side of said saddle, each leg having a said cooperating surface.

5. A motor as claimed in claim 4, wherein an aperture is provided in the saddle and a prong is provided on the member, between the legs thereof, the prong being received in the aperture and cooperating with a wall of the aperture to hold the member in the first and second positions.

6. A motor as claimed in claim 4, wherein said recess extends from an end wall of the end cap, steps are formed in the base of the recess, on either side of the saddle, and said terminal parts are located behind said steps, said legs cooperating with said steps when said member is in the first position to form a tunnel for leading the supply lead wire into the U-shaped terminal part, said supply lead wires being clamped between the upper wall and the steps when said member is in the second position.

* * * * *